Sept. 9, 1930.   G. D. WELTY   1,775,446
PISTON
Filed Aug. 12, 1926

INVENTOR
George Donald Welty
BY
Richey and Watts
ATTORNEYS

Patented Sept. 9, 1930

1,775,446

UNITED STATES PATENT OFFICE

GEORGE DONALD WELTY, OF CLEVELAND, OHIO, ASSIGNOR, BY MESNE ASSIGNMENTS, TO THE CLEVELAND TRUST COMPANY, OF CLEVELAND, OHIO, A CORPORATION OF OHIO

PISTON

Application filed August 12, 1926. Serial No. 128,764.

This invention relates to a piston. It is particularly applicable to pistons for use in internal combustion motors and which are made of material having a co-efficient of expansion different from that of the cylinders in which they operate, as for instance, aluminum or aluminum pistons operating in cast iron cylinders.

As is well known, such pistons possess many desirable qualities such as lightness, high heat conductivity, and the like. However, the differences in expansion rates of the pistons and cylinders produce various difficulties and disadvantages. For example, the pistons may either stick when hot or slap when cold.

The principal object of my invention is to provide a piston which can be fitted to a cylinder with a very small clearance and which, while sufficiently stiff and rigid to transmit pressure from the piston head to the cylinder walls, will be sufficiently flexible to yield upon expanding before binding or scoring the cylinder walls.

Another object is to provide a piston with a skirt which possesses substantially uniform flexibility on every diameter.

Other objects will hereinafter appear.

The invention will be better understood from the description of one practical embodiment thereof, illustrated in the accompanying drawings, in which, Fig. 1 is a side elevation of a piston embodying the invention.

Figure 1:
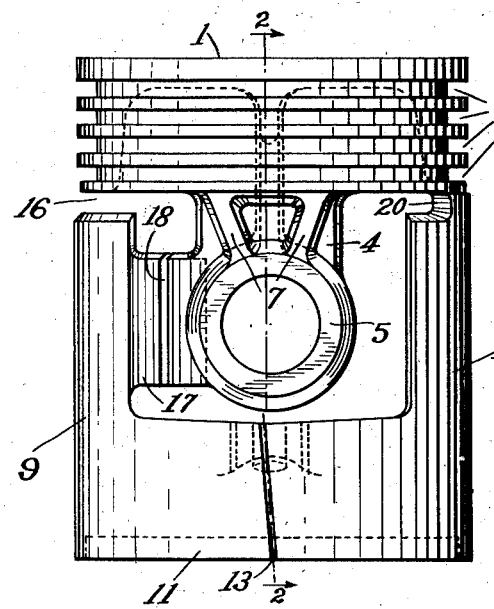
Figure 2:
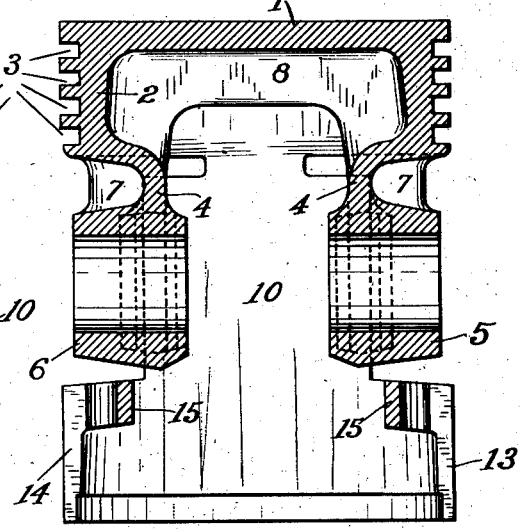
Fig. 2 is an axial cross section thereof taken on line II—II of Fig. 1.
Figure 3:
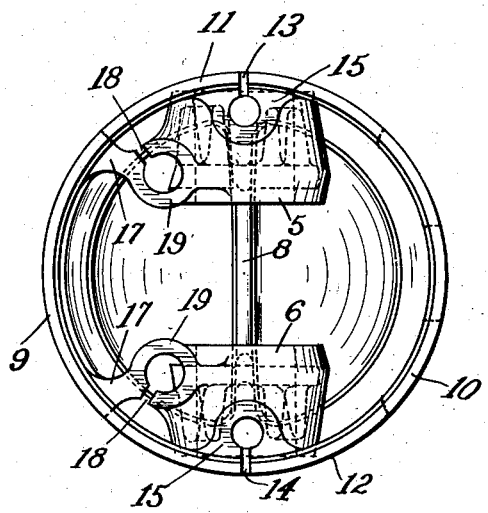
Fig. 3 is a bottom plan view thereof.

The piston has a head comprising a top 1, and a depending peripheral flange 2 which may be provided with grooves 3 for receiving the usual piston rings.

From the head 1, walls or webs 4 depend and carry the wrist pin bosses 5 and 6. The walls 4 may be stiffened and strengthened by a diametric web 8.

Below the head is a skirt comprising maximum and minimum thrust or bearing faces 9 and 10 positioned intermediate the bosses and joined together therebelow by relatively narrow strap-like bearing members 11 and 12. These latter members are split longitudinally of the piston as at 13 and 14 and these splits are spanned by arcuate bridges or culverts 15 or are otherwise joined to render the bottom of the skirt flexible so that it may yield on expansion of the metal.

Figure 4:
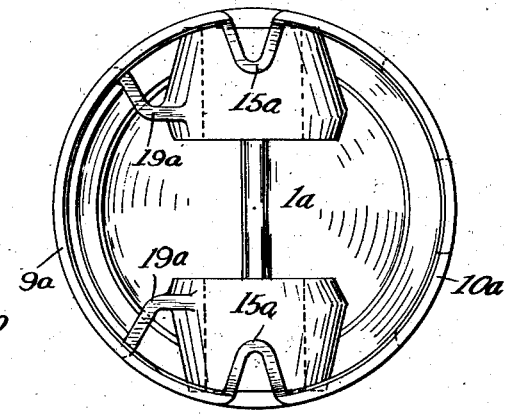
Fig. 4 is a bottom plan view of a modification having cast, unmachined connectors.

The maximum thrust bearing face 9 is separated from the head by an air gap 16 and is connected to the bosses by flexible walls 17 which may be split longitudinally at 18, the splits being spanned by flexible walls such as bridges or culverts 19. This face, preferably, transmits the thrust of the explosion stroke to the cylinder wall. Flexible connectors of other form including those formed by casting and without machining may be employed if desired instead of bridges 15 and 19, such, for instance, as walls 15ª and 19ª in Fig. 4.

The minimum thrust bearing face 10 is separated from direct contact with the bosses and joined to the head by a centrally located neck 20 of short circumferential length as compared with the circumferential length of the bearing face 10.

It will be seen that when pressure is applied to the piston along any diameter, one or the other or both bearing faces may yield wholly or in part. For instance, if pressure is applied at the centers of the faces, face 9 may yield by flexing and by compressing arches 19 and 15. If it be applied at either of the outer edges of the bearing faces, the diametrically opposite edge of face 10 will yield, flexing and compressing arches 15. As pressure is applied to the bearing faces at points progressively more remote from their centers, it acts on a progressively more flexible part of face 10, due to increasing overhand from support 20 and on a progressively less flexible part of face 9. The changes are substantially equal so that the flexibility does not materially vary.

By properly proportioning the bridges, neck, bearing faces and straps, a skirt may be produced which not only is flexible along any diameter, but is substantially uniformly flexible on all diameters passing through the bearing faces.

By supporting the bearing faces as above described, the piston is not only made uniformly flexible on all diameters through the bearing faces, but may be made with bearing faces much wider than has been possible heretofore, while fitting the cylinder as closely or closer than the prior pistons. The bearing faces may be 85° or more in width and run with uniformly light pressures at all points, whether near the edges or centers. This greatly reduces the friction between the piston and cylinder wall, increasing the power of the engine, and decreasing wear both on piston and cylinder. While flexible, the skirt is well supported and is not slotted through the bearing faces and so is not subject to collapse.

While I have described one embodiment of my invention with some particularity, obviously many other embodiments thereof will occur to those skilled in the art to which it appertains. I, therefore, do not limit myself to the precise details described, but claim as my invention all variations and modifications coming within the scope of the subjoined claims.

I claim:

1. A piston having a head, walls depending therefrom, and two bearing faces, one bearing face being attached to the head and spaced from the walls and the other bearing face being resiliently attached to the walls and spaced from the head.

2. A piston having a head, boss carrying side walls depending therefrom, a skirt comprising two bearing faces joined together below the walls and bosses, one bearing face being connected to the head and spaced from the walls and bosses and the other bearing face being resiliently connected to the walls and bosses and spaced from the head.

3. A piston having a head, boss carrying side walls depending therefrom, and a skirt comprising two bearing faces resiliently connected below the walls and bosses, one bearing face being rigidly connected at its center to the head and spaced from the walls and bosses, and the other bearing face being spaced from the head and resiliently connected to the walls and bosses.

4. A piston comprising a head, a skirt having two bearing faces, a relatively rigid connection between the center of one bearing face and the head, a resilient connection between the sides of the other bearing face and the head, and resilient connections between the bearing faces.

5. A piston comprising a head, a skirt and bosses, one thrust portion of the skirt being connected to the head and the other thrust portion being connected to the bosses by connectors all disposed in different diametrical planes of the piston.

6. A piston comprising a head, a skirt and bosses, and connectors joining the skirt with the head and with the bosses, the said connectors all being located in different diametrical planes of the piston.

7. A piston comprising a head, a skirt including opposed sections having thrust faces, wrist pin bosses associated with the head, means connecting an intermediate portion only of one skirt section to the head, this said skirt section being spaced from the bosses, the opposed section being separated from the head, and means for resiliently connecting the said opposed section to the bosses, all of the connecting means being in different diametric planes of the piston.

8. A piston comprising a head, a skirt including opposed sections having thrust faces, wrist pin bosses associated with opposite sides of the head, means connecting an intermediate portion only of one skirt section to the head, this said skirt section being unconnected with the bosses, the opposed section being separated from the head, means for resiliently connecting opposite sides of the said opposed section to the bosses, whereby all of the connecting means are in different diametric planes of the piston.

9. A piston comprising a head, a skirt including opposed sections having thrust faces, wrist pin bosses associated with the head, means spaced from the bosses connecting one skirt section to the head, the skirt section being spaced from the bosses, the opposed section being separated from the head, means for resiliently connecting the said opposed section to the bosses, whereby all of the connecting means lie in different diametric planes of the piston.

10. A piston comprising a head, a skirt including opposed sections having thrust faces, wrist pin bosses associated with the head, means non-resilient with respect to the skirt sections connecting an intermediate portion of one skirt section to the head, the skirt section being unconnected with the bosses, the opposed section being separated from the head, and means for resiliently connecting the said opposed section to the bosses, whereby all of the connecting means lie in different diametric planes of the piston.

11. A piston comprising a head, a skirt including opposed sections having thrust faces, wrist pin bosses associated with the head, means spaced from the bosses connecting one skirt section to the head, the skirt section being spaced from the bosses, the opposed section being separated from the head, spaced means for resiliently connecting the said opposed section to the bosses whereby the connecting means lie in different diametric planes, and section means for resiliently connecting adjoining sides of the skirt.

In testimony whereof I hereunto affix my signature this 9th day of August, 1926.

GEORGE DONALD WELTY.